(12) United States Patent
Levin

(10) Patent No.: US 8,262,029 B2
(45) Date of Patent: Sep. 11, 2012

(54) ELECTRODYNAMIC METHOD

(75) Inventor: Eugene M. Levin, Minnetonka, MN (US)

(73) Assignee: Star Technology and Research, Inc., Mount Pleasant, SC (US)

( * ) Notice: Subject to any disclaimer, the term of this patent is extended or adjusted under 35 U.S.C. 154(b) by 0 days.

(21) Appl. No.: 13/044,388

(22) Filed: Mar. 9, 2011

(65) Prior Publication Data
US 2011/0154803 A1 Jun. 30, 2011

Related U.S. Application Data

(62) Division of application No. 11/372,508, filed on Mar. 10, 2006, now Pat. No. 7,913,954.

(51) Int. Cl.
*B64G 1/40* (2006.01)
(52) U.S. Cl. .................................................. 244/171.5
(58) Field of Classification Search ............. 244/171.7, 244/171.8, 158.1–158.9; 60/202
See application file for complete search history.

(56) References Cited

U.S. PATENT DOCUMENTS

| | | | |
|---|---|---|---|
| 5,198,832 A | 3/1993 | Higgins et al. | |
| 6,313,811 B1 | 11/2001 | Harless | |
| 6,404,089 B1 | 6/2002 | Tomion | |
| 6,431,497 B1 | 8/2002 | Hoyt et al. | |
| 6,565,044 B1 | 5/2003 | Johnson et al. | |
| 6,755,377 B1 | 6/2004 | Levin et al. | |
| 6,758,443 B1 | 7/2004 | Levin et al. | |
| 6,828,949 B2 | 12/2004 | Harless | |
| 6,942,186 B1 | 9/2005 | Levin et al. | |

OTHER PUBLICATIONS

C. Sickinger et al., "Ultra-Lightweight Deployable Space Structures", 4th International Conference on Thin Walled Structures, Loughborought, England, Jun. 22-24, 2004 (9 pages).
G. Tibert, "Deployable Tensegrity Structures for Space Applications", Royal Institute of Technology Department of Mechanics, Doctoral Thesis, Stockholm Sweden, Apr. 2002 (242 pages).
Jerome Pearson et al., "Orbital Maneuvering with Spinning Electrodynamic Tethers", American Institute of Aeronautics and Astronautics, 2nd International Energy Conversion Engineering Conference, Providence, Rhode Island, Aug. 16-19, 2004 (7 pages).
Nestor Voronka, "Modular Spacecraft with Integrated Structural Electrodynamic Propulsion", Tethers Unlimited, Defensetech.org, http://www.defensetech.org/archives/001621.html Jun. 16, 2005 (2 pages).

*Primary Examiner* — Tien Dinh
*Assistant Examiner* — Valentina Xavier
(74) *Attorney, Agent, or Firm* — Dicke, Billig & Czaja, PLLC

(57) ABSTRACT

An electrodynamic method includes providing an electrodynamic structure with a periphery, providing power, collecting electrons, and emitting electrons. The emitting electrons and the collecting electrons utilizes at least 20% of the periphery of the electrodynamic structure. The method includes conducting current to provide at least one of electrodynamic propulsion and power generation.

24 Claims, 11 Drawing Sheets

US 8,262,029 B2

ELECTRODYNAMIC METHOD

CROSS-REFERENCE TO RELATED APPLICATIONS

This Patent Application is a Divisional of and claims priority to co-pending U.S. patent application Ser. No. 11/372,508, filed on Mar. 10, 2006, which is incorporated herein by reference.

BACKGROUND

The potential use of long electric conductors in space in a form of electrodynamic tethers was discovered in early 80's. Electrodynamic tethers in space have attracted a lot of attention in recent years. Many researchers have contributed to the theory of their behavior in orbit. Some flight experiments have provided data on the interaction between the electrodynamic tethers and the geomagnetic field and ionosphere.

Typically, an electrodynamic tether is a long electrical conductor that can be used to generate power and/or propulsion as the tether orbits a celestial body with a magnetic field. Flight experiments have provided data on the interaction between electrodynamic tethers and the geomagnetic field and ionosphere of the Earth.

In 1993, the Plasma Motor Generator (PMG) experiment was performed on a Delta rocket with a primary goal of testing power generation and thrust by means of an electrodynamic tether. In the PMG experiment, a 500 meter (m) long electrodynamic tether was deployed into the ionosphere. The tether included a conducting wire with hollow cathodes at each end. An electric current was produced in the tether, demonstrating the potential of this technique to generate power and propulsion that could be used by satellites or space stations in low Earth orbit (LEO). The PMG mission was an example of a propulsion system for space transportation that did not utilize propellant, but rather achieved propulsion by converting orbital energy into electrical energy (deorbit) or electrical energy into orbital energy (orbit boosting).

Two Tethered Satellite System (TSS) missions were flown in 1992 and 1996. The TSS included a satellite, a conducting tether, and a tether deployment/retrieval system flown on the Space Shuttle. Objectives of the TSS missions were to understand the electro-magnetic interaction between the tether system and the ambient space plasma, investigate its dynamics, and demonstrate current collection from the ionosphere to further develop tether capabilities for future tether applications on the Space Shuttle and Space Station. In the TSS-1 mission of 1992, the tether was only partially deployed and the mission was aborted.

The TSS-1R mission of 1996 was a re-flight of the TSS-1 mission. The tether was deployed to the length of 19.7 km when it was severed by an electrical arc. Nevertheless, it was a significant mission for tethered satellites because it showed that electrodynamic tethers were more efficient than theoretically predicted, providing valuable data on electrical performance of the system. Power generation of several kilowatts was demonstrated.

"Tethers in Space Handbook," Second Edition, NASA Office of Space Flight, NASA Headquarters, Washington, D.C., 1989, edited by P. A. Penzo and P. W. Ammann, provides summaries of various applications and features of electrodynamic tethers, including methods to change orbital elements with electrodynamic tether propulsion and methods to control attitude dynamics of tethers.

Typically, electrodynamic tethers are very long and operate at high voltages. The electrodynamic tethers run the risk of arcing as in the TSS-1R mission. Also, the electrodynamic tethers are susceptible to damage from meteors and/or debris due to the length of the tethers. In addition, electrodynamic tethers are difficult to scale up to move heavy payloads.

For these and other reasons, there is a need for the present invention.

SUMMARY

One embodiment provides an electrodynamic method including providing an electrodynamic structure with a periphery, providing power, collecting electrons, and emitting electrons. The emitting electrons and the collecting electrons utilizes at least 20% of the periphery of the electrodynamic structure. The method includes conducting current to provide at least one of electrodynamic propulsion and power generation.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "upper," "lower," "front," "back," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
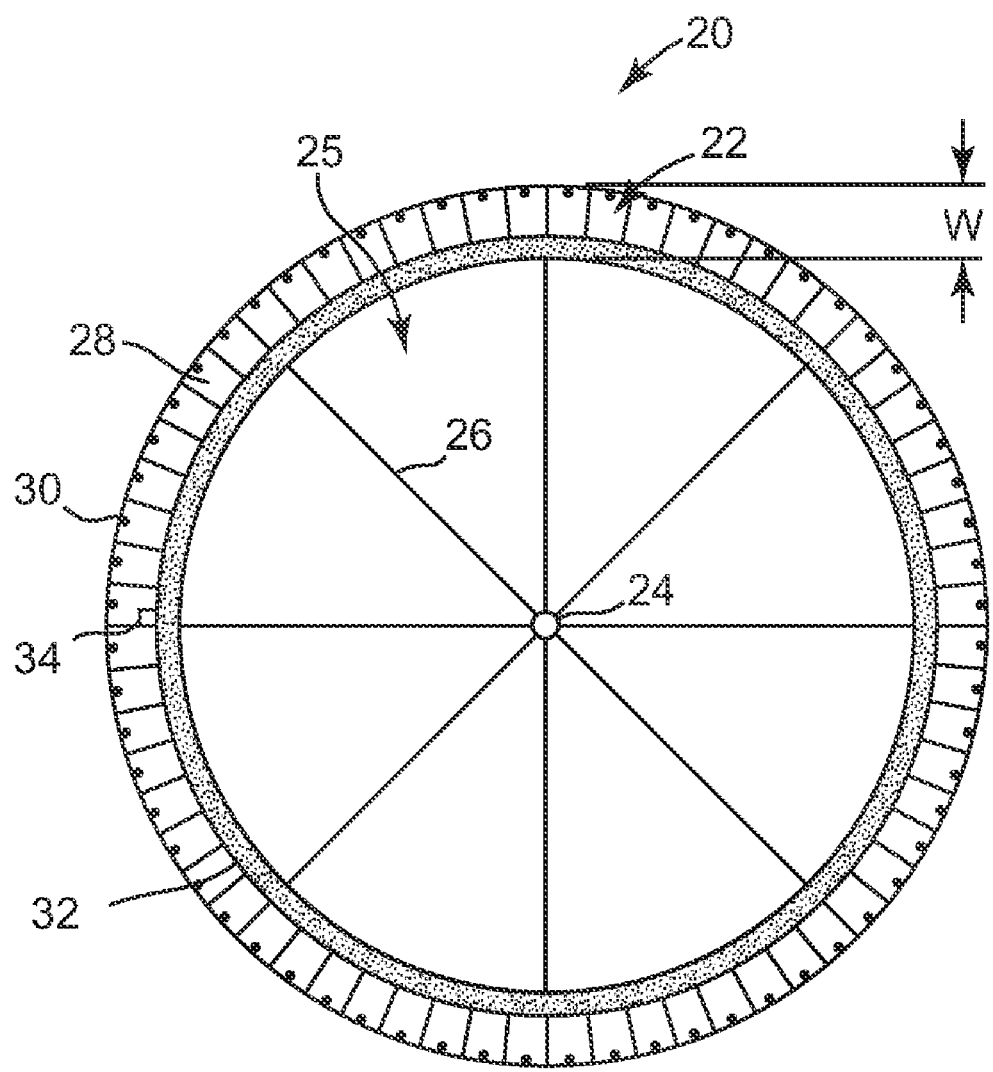
FIG. 1 is a diagram illustrating one embodiment of an electrodynamic structure according to the present invention.

FIG. 1 is a diagram illustrating one embodiment of an electrodynamic structure 20 according to the present invention. Electrodynamic structure 20 is configured to generate power and/or propulsion as it orbits a celestial body having a magnetic field. In one aspect, electrodynamic structure 20 is an electrodynamic sail. In other embodiments, electrodynamic structure 20 can be part of any suitable system, such as a space station.

Electrodynamic structure 20 is substantially a circular, two-dimensional, planar electrodynamic structure that includes a periphery area 22 and supports 26. As illustrated, electrodynamic structure 20 is coupled to a payload 24. Periphery area 22 is situated at the periphery of electrodynamic structure 20 and has width W. Payload 24 is disposed in the center of electrodynamic structure 20 and is mechanically coupled to periphery area 22 via supports 26. An interior area 25 is defined between an interior edge of periphery area 22 and payload 24. In one embodiment, interior area 25 includes open gaps (i.e., gaps that do not contain components or material) between each of the supports 26.

In some embodiments, some or all parts and components are mounted on a substrate, such as a plastic film, to provide mechanical support. In some embodiments, a portion or all of periphery area 22 is covered with a substrate. In some embodiments, a portion or all of interior area 25 is covered with a substrate. In one embodiment, the substrate is a reflective film.

In the embodiment illustrated in FIG. 1, periphery area 22 includes electron collectors 28, electron emitters 30, solar arrays 32, and one or more controllers 34. As illustrated, electron collectors 28 and electron emitters 30 are situated at an outer rim of periphery area 22. As illustrated, solar arrays 32 are situated at an interior rim of periphery area 22.

In embodiments of two-or three-dimensional electrodynamic structures, electron collectors, electron emitters, solar arrays, and controllers can be disposed in the periphery area, such as periphery area 22. Additionally, in embodiments of two-or three-dimensional electrodynamic structures, electron collectors, solar arrays, and controllers can be disposed in the interior area, such as interior area 25.

Figure 3:
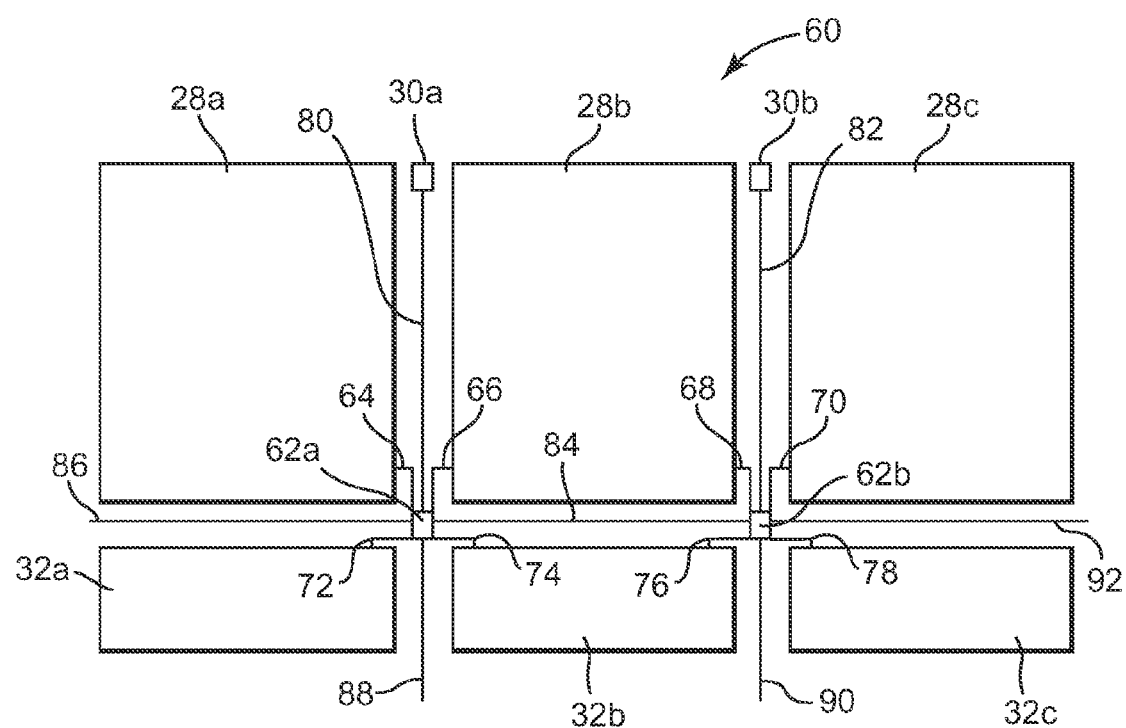
FIG. 3 is a diagram illustrating one embodiment of electrical components in a portion of a periphery area.

Electron collectors 28, electron emitters 30, solar arrays 32, and controllers 34 are electrically coupled via conductive paths formed with switches and conductors. The conductive paths are not shown in FIG. 1 for clarity, but one embodiment of a portion of a periphery area including conductive paths formed with switches and conductors is illustrated in FIG. 3 and discussed below. In one embodiment, electron collectors 28 are electrically coupled to each other via conductive paths formed with switches and conductors. In one embodiment, electron emitters 30 are electrically coupled to each other via conductive paths formed with switches and conductors. In one embodiment, solar arrays 32 are electrically coupled to each other via conductive paths formed with switches and conductors. In one embodiment, conductive paths include conductors that include insulated strips of aluminum foil.

Supports 26 are members that mechanically couple payload 24 to periphery area 22. In one embodiment, supports 26 are non-rigid supports. In one embodiment, supports 26 are mechanically stiffened supports. In one embodiment, supports 26 are conductive and payload 24 and electrical components in periphery area 22 are electrically coupled via the conductive supports 26.

In embodiments of two-or three-dimensional electrodynamic structures, payloads, such as payload 24, can be any suitable payload, such as a satellite that orbits the Earth, an inter-planetary satellite, or a satellite that orbits any suitable celestial body. In one embodiment, electrical components in the periphery area, such as periphery area 22, are electrically coupled to the payload (e.g., payload 24) via supports (e.g., support 26) and the payload receives power from electrical components in the periphery area. In one embodiment, the payload includes one or more controllers that control operation of the electrodynamic structure (e.g., electrodynamic structure 20).

The electron collectors, such as electron collectors 28, described herein are defined to collect electrons from the ambient plasma. In one embodiment, the electron collectors are bare aluminum coated surfaces. In other embodiments, the electron collectors can be any suitable type of electron collectors.

The electron collectors can cover not only a relatively narrow band around the periphery (e.g., periphery area 22) of the electrodynamic structure, but also much wider areas, reaching into the interior (e.g., interior area 25) of the electrodynamic structure. In one embodiment, the entire surface of the electrodynamic structure is employed for electron collection.

The electron emitters, such as electron emitters 30, described herein are defined to emit electrons into the ambient plasma. In one embodiment, the electron emitters are field emitter array cathodes (FEACs). In other embodiments, the electron emitters can be any suitable type of electron emitters.

The solar arrays, such as solar arrays 32, described herein are defined to absorb solar energy, and provide power in the form of electricity. In one aspect, solar arrays are one type of power system. In one aspect, solar arrays are solar energy collection devices. In one embodiment, solar arrays are thin-film solar arrays. In embodiments of two-or three-dimensional electrodynamic structures, any suitable power system can be used to generate power and electricity.

Figure 2:
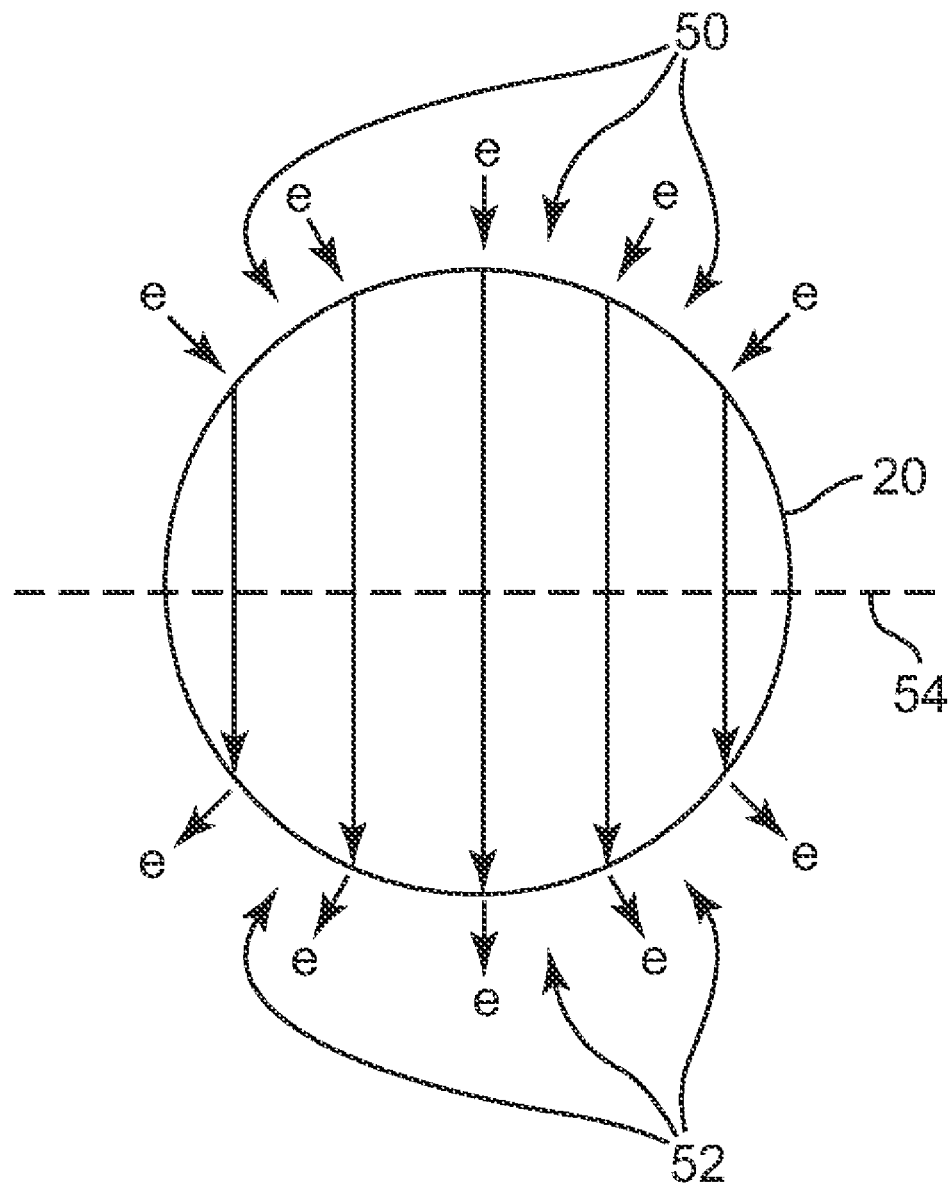
FIG. 2 is a diagram illustrating the flow of electrons in a two-dimensional, planar electrodynamic structure.

One or more controllers, such as controller 34, control operation of embodiments of electrodynamic structures (e.g., electrodynamic structure 20) via the switches and conductors in the conductive paths. FIG. 2 is a diagram illustrating the flow of electrons in a two-dimensional, planar electrodynamic structure, such as electrodynamic structure 20. At 50, electron collectors (e.g., collectors 28) on one side of the electrodynamic structure are controlled with one or more controllers to collect electrons from ambient plasma. Under the control of one or more controllers, the collected electrons are driven to electron emitters (e.g., emitters 30) on the opposite side of the electrodynamic structure via conductors in the conductive paths. The collected electrons are driven using power generated via the power system (e.g., solar arrays 32). In addition, the motion through the ambient magnetic field produces an electro-motive force (EMF) in the conductors of the conductive paths, which can also be used to drive electrons to the opposite side of the electrodynamic structure in the direction of the EMF. At 52, electron emitters (e.g., emitters 30) on the opposite side of the electrodynamic structure are controlled by one ore more controllers to emit electrons into the ambient plasma. The currents flowing through the conductors of the conductive paths between the electron collectors and the electron emitters interact with the ambient magnetic field to produce distributed Ampere forces, which can be employed to change the orbit and the orientation of the electrodynamic structure.

In one embodiment, the area of electron collection at 50 and the area of electron emission at 52 are determined dynamically, as the electrodynamic structure moves including as the electrodynamic structure rotates, in the magnetic field of the celestial body and as the electrodynamic structure moves including as the electrodynamic structure rotates around its center of mass. In the area of electron collection at 50, electron emitters remain inactive and in the electron emission area at 52, electron collectors remain inactive. As the electrodynamic structure moves, electron collectors and electron emitters are turned on (selected) and turned off (deselected) at switching line 54 via one or more controllers to maintain one side as the area of electron collection at 50 and the other side as the area of electron emission at 52.

Conductors employed in embodiments of two-or three-dimensional electrodynamic structures can operate bi-directionally in the sense that the electrical current can flow either in the direction of the EMF induced in the conductor, or in the reverse direction, depending on the conductor orientation with respect to the magnetic field, mission goals, available power, and other system parameters. The reverse current is driven by available power sources, such as solar arrays 32. If the current is reversed, electron collection and electron emission locations are reversed. Electron collection and emission occurs at multiple locations at the same time, to allow better utilization of thrust and power generation capabilities and to better control dynamics and optimize orbital maneuvering.

Electrodynamic structure 20 is substantially a two-dimensional, planar electrodynamic structure having a circular shape. Embodiments of two-dimensional electrodynamic structures can be any suitable physical shape, such as, elliptical (e.g., circular, elongated elliptical) or polygonal, (e.g., rectangular, square, hexagonal).

Embodiments of two-dimensional electrodynamic structures (e.g., electrodynamic structure 20) can be spin stabilized, wherein the spin axis is normal to the plane of the figure, such as FIG. 1. Embodiments of electrodynamic structures can spin at angular rates of 2 to 36 times the orbital rate. In each application, the spin rate is chosen based on performance and design trade-offs. In one embodiment, the electrodynamic structure spins at an angular rate that is substantially 6 to 8 times the orbital rate.

Embodiments of electrodynamic structures (e.g., electrodynamic structure 20) can adjust spin axis, spin rate, and/or spin phase by varying direction, duration, amount, and/or path-length of currents flowing through the conductors. The orientation of the spin axis with respect to the orbital plane is chosen as best suited for a particular mission. For example, the spin axis can be pointed toward the Sun to maximize solar energy collection. Throughout the mission, the evolution of the spin axis orientation, the average spin rate, and the spin phase are controlled by modulations of the electrodynamic torques produced by variations in the electric current through the conductive paths. The spin-control current variations can be chosen to optimize the performance of the electrodynamic structure, while maintaining stability.

Due to the spinning of embodiments of two-dimensional electrodynamic structures, the EMF induced in the conductors of the conductive paths changes direction during every revolution. To optimize variations in orbital elements and/or to optimize power generation, switches are controlled to drive electrons in a different direction during each revolution of the electrodynamic structure. As the electrodynamic structure spins, the switches are controlled to switch from electron collection on one side of the electrodynamic structure to electron collection on the other side of the electrodynamic structure and to switch from electron emission on the other side of the electrodynamic structure to electron emission on the one side of the electrodynamic structure.

Since, the respective orientations of embodiments of spinning two-dimensional electrodynamic structures to the magnetic field are continuously changing and the currents in the conductors change with the rotation of the electrodynamic structure, the long-term evolution of the orbital and spin parameters is defined by a cumulative effect of the Ampere forces over periods of time longer or much longer than the spin period. Short-term oscillations of the dynamic and electrical parameters of the system, with periods shorter or much shorter than the spin period, are superimposed on the long-term evolution. The overall performance of electrodynamic structures can be estimated by averaging over a period of many orbits, which takes into consideration several groups of factors, including factors that change with the spin period, factors that change with the orbital period, and factors that change with the magnetic field rotation of the celestial body.

The performance level of a substantially two-dimensional electrodynamic, planar structure (e.g., electrodynamic structure 20) can be estimated via Equation I.

$$F/M = K*U*(I/M)*B*(S/P) \qquad \text{Equation I}$$

wherein F/M is the average total propulsion force of the electrodynamic structure per unit mass of the electrodynamic structure;

U is the fraction of the periphery of the electrodynamic structure utilized for electron collection and emission;

(I/M) is the average total current collected and emitted per unit mass of the electrodynamic structure;

B is the induction of the magnetic field of the celestial body;

P is the value of a structure perimeter, where the periphery of the electrodynamic structure defines the structure perimeter;

S is the area enclosed by the structure perimeter; and

K is a dimensionless coefficient based on the electrodynamic structure implementation.

Parameters in Equation I related to two-dimensional electrodynamic structures, such as electrodynamic structure 20, can be maximized to optimize the performance level of the electrodynamic structure. Such parameters include periphery utilization for electron collection and emission U, area to perimeter ratio (S/P), and electric current production per unit mass of the electrodynamic structure (I/M). In many embodiments, parameter K is close to 2. The magnetic induction B does not depend on characteristics of the electrodynamic structure.

In some embodiments, to maximize U, the entire periphery of the electrodynamic structure (e.g., electrodynamic structure 20) is lined with electron collectors (e.g., collectors 28) and electron emitters (e.g., emitters 30), as illustrated in FIG. 1. This yields a utilization factor of U=1 or 100%. If half of the periphery of the electrodynamic structure includes electron collectors and electron emitters and the other half is empty, U=½ or 50%. It is overly inefficient for the electrodynamic structure to have periphery utilization U of less than ⅕ or 20%.

The area to perimeter parameter (S/P) is maximized if the electrodynamic structure is circular such as electrodynamic structure 20. Other shapes, provide smaller area to perimeter ratios (S/P). Square or hexagonal shapes provide smaller but comparable (S/P) ratios, while elongated shapes, such as elongated elliptical shapes and elongated rectangular shapes have substantially lower (S/P) ratios. It is overly inefficient for the electrodynamic structure to have an area to perimeter ratio (S/P) less than ¼ or 25% of the ratio for a circle with the same perimeter.

The electric current production per unit mass of the electrodynamic structure (I/M) depends on the electron collection and electron emission technologies and on the weight of the support structures. In one embodiment, electrodynamic structure 20 includes thin film solar arrays 32, thin foil electron collectors 28, FEAC electron emitters 30, and a lightweight flexible spin-stabilized structure. In one embodiment, maximum electric current production per unit mass of electrodynamic structure 20 in LEO is at least 1 Ampere per kilogram (A/kg). It is overly inefficient for the electrodynamic structure to have maximum electric current production per unit mass in LEO less than 0.1 A/kg.

In one embodiment, an electrodynamic structure, such as electrodynamic structure 20, operates without batteries and stores energy in orbital motion instead of batteries. In one embodiment, while the electrodynamic structure is in sunlight, it accumulates energy by gaining altitude. Then, in eclipse, the electrodynamic structure uses the EMF induced in some of its conductors to drive electric currents through other conductors to produce, for example, out-of-plane forces and to continue changing the orbit inclination even without direct solar energy input.

In one embodiment, in eclipse, the conductors with largest EMF's can be used for power generation, while other conductors with favorable orientations with respect to the magnetic field can utilize this power to produce thrust components to change certain orbit elements.

Embodiments of electrodynamic structures having two or three dimensions, such as electrodynamic structure 20, have small dimensions compared to one-dimensional electrodynamic tether systems. Due to these small dimensions, embodiments of the electrodynamic structures operate with low voltages that reduce the risk of arcing. In one embodiment, electrodynamic structure 20 has a 400 meter (m) diameter and in LEO experiences only 80 V or less of EMF induced in its conductors.

Also, embodiments of electrodynamic structures having two or three dimensions, such as electrodynamic structure 20, provide more efficient electrodynamic propulsion and power generation and can be scaled to propel heavy payloads. In one embodiment, a 900-1000 kg electrodynamic structure that is 400 m in diameter can change the inclination of a 2,000 kg payload in LEO at a rate of up to 0.7 degrees per day. To match this performance, an electrodynamic tether would need to be 80 km long and be able to operate at a voltage of 16 kV.

In addition, embodiments of electrodynamic structures having two or three dimensions, such as electrodynamic structure 20, are inherently resistant to meteor and debris damage. This is due at least in part to distributed designs and the redundancy of components. In the case of damage to one or more of the electron collectors, electron emitters, solar arrays, and/or supports, the controllers (e.g., controller 34) can reconfigure the conductive paths to bypass the failed component(s) and reroutes currents.

FIG. 3 is a diagram illustrating one embodiment of electrical components 60 in a portion of a periphery area, such as periphery area 22. The electrical components 60 include electron collectors 28a-28c, electron emitters 30a and 30b, solar arrays 32a-32c, and switches 62a and 62b. The conductive paths that electrically couple electron collectors 28, electron emitters 30, solar arrays 32, and one or more controllers 34 include switches 62a and 62b.

Electron collector 28a is electrically coupled to switch 62a via conductive path 64. Electron collector 28b is electrically coupled to switch 62a via conductive path 66 and to switch 62b via conductive path 68. Electron collector 28c is electrically coupled to switch 62b via conductive path 70. Solar array 32a is electrically coupled to switch 62a via conductive path 72. Solar array 32b is electrically coupled to switch 62a via conductive path 74 and to switch 62b via conductive path 76. Solar array 32c is electrically coupled to switch 62b via conductive path 78. Electron emitter 30a is electrically coupled to switch 62a via conductive path 80 and electron emitter 30b is electrically coupled to switch 62b via conductive path 82. Switch 62a is electrically coupled to switch 62b via conductive path 84. Switch 62a is electrically coupled to other switches (not shown) via conductive paths 86 and 88 and switch 62b is electrically coupled to other switches (not shown) via conductive paths 90 and 92.

One or more controllers 34 control switches 62a and 62b and employ the power from solar arrays 32a-32c to drive electrons across electrodynamic structure 20.

If the electrical components 60 are in the area of electron collection at 50 (shown in FIG. 2), one or more controllers 34 control switches 62a and 62b to turn on electron collectors 28a-28c and turn off electron emitters 30a and 30b. Also, one or more controllers 34 control switches 62a and 62b to deliver the voltage produced via solar arrays 32a-32c to drive the electrons across electrodynamic structure 20 via conductors 86, 88, 90, and/or 92.

In one embodiment, in the area of electron collection at 50, one or more controllers 34 control switches 62a and 62b to couple electron collectors 28a-28c together and the combined electrons are driven to the area of electron emission at 52 (shown in FIG. 2) via conductive paths 86, 88, 90, and/or 92. In one embodiment, in the area of electron collection at 50, one or more controllers 34 control switches 62a and 62b to drive electrons from each of the electron collectors 28a-28c independently to the area of electron emission at 52 via conductive paths 86, 88, 90, and/or 92.

If the electrical components 60 are in the area of electron emission at 52, one or more controllers 34 control switches 62a and 62b to turn on electron emitters 30a and 30b and turn off electron collectors 28a-28c. Also, one or more controllers 34 control switches 62a and 62b to deliver the voltage produced via solar arrays 32a-32c to drive the electrons as needed via conductive paths 86, 88, 90, and/or 92.

In one embodiment, in the area of electron emission at 52, one or more controllers 34 control switches 62a and 62b to couple electron emitters 30a and 30b together and drive electrons from the area of electron collection at 50 to both electron emitters 30a and 30b substantially together via conductive paths 86, 88, 90, and/or 92. In one embodiment, in the area of electron emission at 52, one or more controllers 34 control switches 62a and 62b to drive electrons to electron emitters 30a and 30b independently from the area of electron collection at 50 via conductive paths 86, 88, 90, and/or 92.

Figure 4:
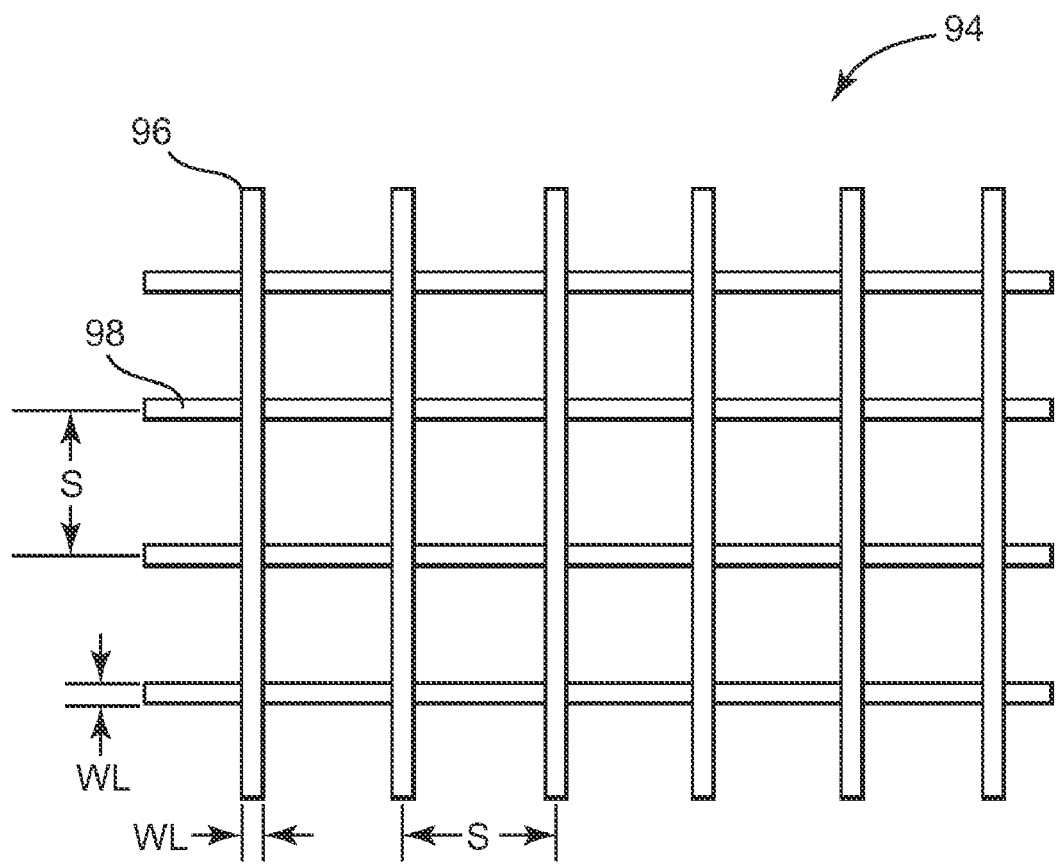
FIG. 4 is a diagram illustrating one embodiment of an open net-like collector structure.

FIG. 4 is a diagram illustrating one embodiment of an open net-like collector structure 94 that can be used in any two-or three-dimensional electrodynamic structure. Net-like collector structure 94 includes column ligaments 96 and row ligaments 98 that intersect at cross points. In one embodiment, at least some of the column ligaments 96 and row ligaments 98 are narrow tapes with bare metallic surfaces. In one embodiment, at least some of the column ligaments 96 and row ligaments 98 are narrow tapes with bare aluminum surfaces. In other embodiments, column ligaments 96 and row ligaments 98 can be any suitable ligament material.

The open net-like collector structure 94 is more efficient if column ligaments 96 and row ligaments 98 are spaced at distances S that are many times larger than the width WL of each of the column ligaments 96 and row ligaments 98. The net-like collector structure 94 can cover not only a relatively narrow band around the periphery (e.g., periphery area 22) of an electrodynamic structure, such as electrodynamic structure 20, but also much wider areas, including into the interior (e.g., interior area 25) of the electrodynamic structure. In one embodiment, the entire surface of the electrodynamic structure is used for electron collection via an open net-like collector structure, such as open net-like collector structure 94. In one embodiment, at least a portion of column ligaments 96 and/or row ligaments 98 are simultaneously employed as collectors and conductors of the conductive paths.

Figure 5:
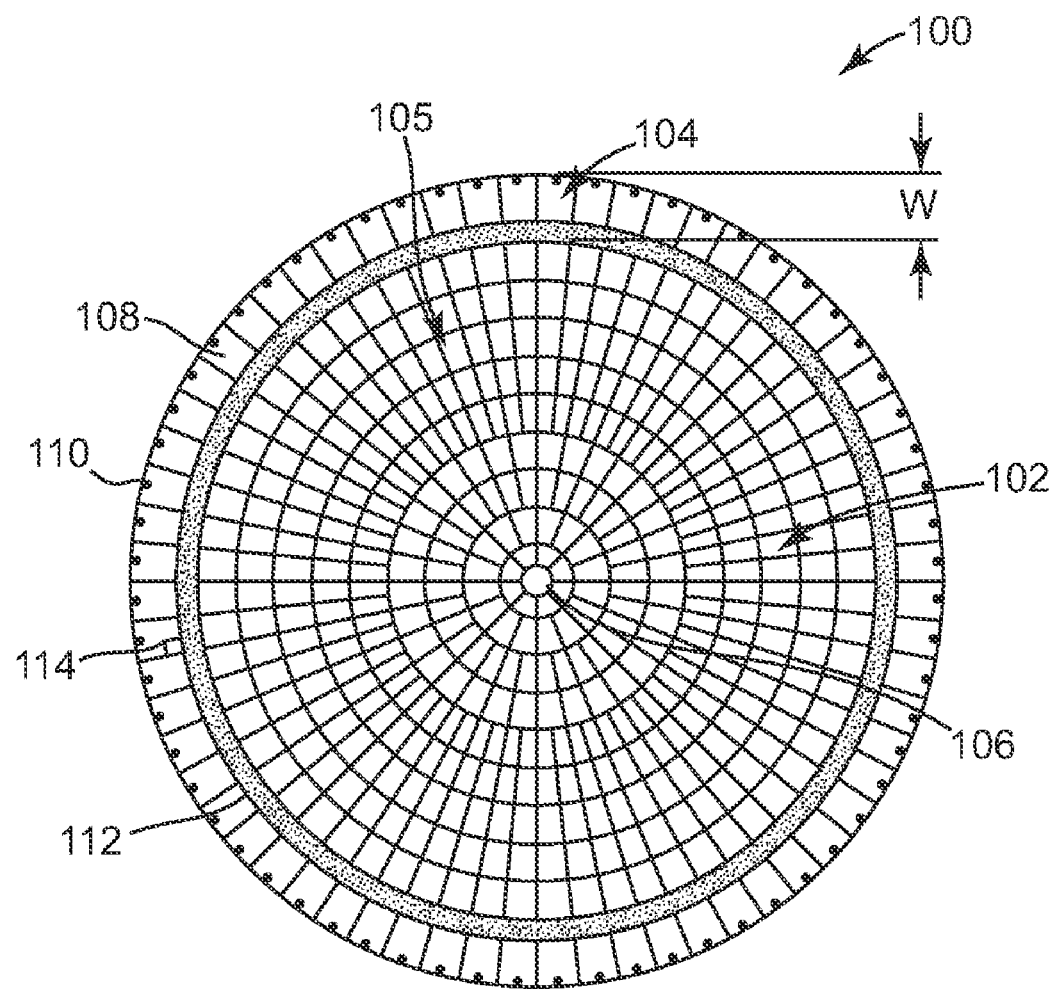
FIG. 5 is a diagram illustrating one embodiment of a circular, two-dimensional, planar electrodynamic structure that includes a mesh of conductors.

FIG. 5 is a diagram illustrating one embodiment of a circular, two-dimensional, planar electrodynamic structure 100 that includes a mesh of conductors 102 disposed in an interior area 105. Electrodynamic structure 100 is configured to generate power and/or propulsion as it orbits a celestial body having a magnetic field. In one aspect, electrodynamic structure 100 is an electrodynamic sail. In one aspect, electrodynamic structure 100 is similar to electrodynamic structure 20, with the exception that electrodynamic structure 100 includes the mesh of conductors 102. In other embodiments, electrodynamic structure 100 can be part of any suitable system, such as a space station.

Conductive paths in electrodynamic structure 100 include the mesh of conductors 102. The mesh of conductors 102 includes conductors that intersect other conductors and switches situated at the cross points of the conductors. The switches are controlled to direct currents through the mesh of conductors 102 and across electrodynamic structure 100 and to direct currents in current loops in the mesh of conductors 102. In some embodiments, meshes of conductors (e.g., the mesh of conductors 102) include conductors that include insulated strips of aluminum foil. In some embodiments, meshes of conductors (e.g., the mesh of conductors 102) include non-conductive supports.

Electrodynamic structure 100 includes the mesh of conductors 102 and periphery area 104. Electrodynamic structure 100 is coupled to a payload 106. Periphery area 104 is situated at the periphery of electrodynamic structure 100 and has width W. Payload 106 is mechanically coupled to components in periphery area 104 via the mesh of conductors 102. Interior area 105 is defined between an interior edge of periphery area 104 and payload 106. In one embodiment, the mesh of conductors 102 in interior area 105 are not mounted on a substrate and are not covered with material. In some embodiments, the mesh of conductors 102 are mounted on a substrate. In one embodiment, the substrate is reflective. In some embodiments, interior area 105 is covered partially or completely with a net-like collector structure, such as net-like collector structure 94.

In the embodiment illustrated in FIG. 5, periphery area 104 includes electron collectors 108, electron emitters 110, solar arrays 112, and one or more controllers 114. As illustrated, electron collectors 108 and electron emitters 110 are situated at an outer rim of the periphery area 104. As illustrated, solar arrays 112 are situated on an interior rim of periphery area 104.

Electron collectors 108, electron emitters 110, solar arrays 112, and controllers 114 are electrically coupled via conductive paths formed with switches and conductors, including the mesh of conductors 102. In one embodiment, electron collectors 108 are electrically coupled to each other via the conductive paths. In one embodiment, electron emitters 110 are electrically coupled to each other via the conductive paths. In one embodiment, solar arrays 112 are electrically coupled to each other via the conductive paths.

The stabilizing mechanical property of the mesh of conductors 102 contributes to stabilizing electrodynamic structure 100. In one embodiment, the mesh of conductors 102 is a non-rigid mesh. In one embodiment, the mesh of conductors 102 includes mechanically stiffened supports and/or mechanically stiffened conductors.

In one embodiment, the mesh of conductors 102 electrically couples payload 106 to the components in periphery area 104. In one embodiment, payload 106 receives power from electrical components in periphery area 104 via the mesh of conductors 102. In one embodiment, payload 106 includes one or more controllers that control operation of electrodynamic structure 100 via control signals communicated on the mesh of conductors.

One or more controllers 114 control operation of electrodynamic structure 100 via switches in the conductive paths, including switches in the mesh of conductors 102.

Electron flow for a two-dimensional electrodynamic structure, such as electrodynamic structure 100, is described above and illustrated in FIG. 2. In electrodynamic structure 100 and other electrodynamic structures having meshes of conductors, the currents flowing through the conductive paths, including currents flowing through the mesh of conductors (e.g., the mesh of conductors 102), interact with the ambient magnetic field to produce distributed Ampere forces, which can be employed to change the orbit and the orientation of the electrodynamic structure. Also, as the mesh of conductors moves through the ambient magnetic field EMF is produced in the conductors, which can be used to drive electrons to the opposite side of the electrodynamic structure in the direction of the EMF.

In addition, power from the power system (e.g., solar arrays 112) and/or EMF in the conductors can be used to drive closed-loop currents through selected closed-loop paths in the mesh of conductors (e.g., the mesh of conductors 102). This does not require electron collection or electron emission. The closed-loop currents interact with the ambient magnetic field to produce distributed Ampere forces and torques to control the attitude dynamics of the electrodynamic structures (e.g., electrodynamic structure 100). These closed-loop currents through selected closed-loop paths in the mesh of conductors can provide improved control of the attitude dynamics of the electrodynamic structure via the mesh of conductors.

Conductors in the conductive paths, including meshes of conductors (e.g., the mesh of conductor 102) can operate bi-directionally in the sense that the electrical current can flow either in the direction of the EMF induced in the conductor, or in the reverse direction, depending on the conductor orientation with respect to the magnetic field, mission goals, available power, and other system parameters. The reverse current is driven by available power sources, such as solar arrays. If the current is reversed, electron collection and electron emission locations are reversed. Meshes of conductors operating in this bi-directional manner facilitate electron collection and emission occurring at multiple locations at the same time, to allow better utilization of thrust and power generation capabilities and to better control dynamics and optimize orbital maneuvering.

Figure 6:
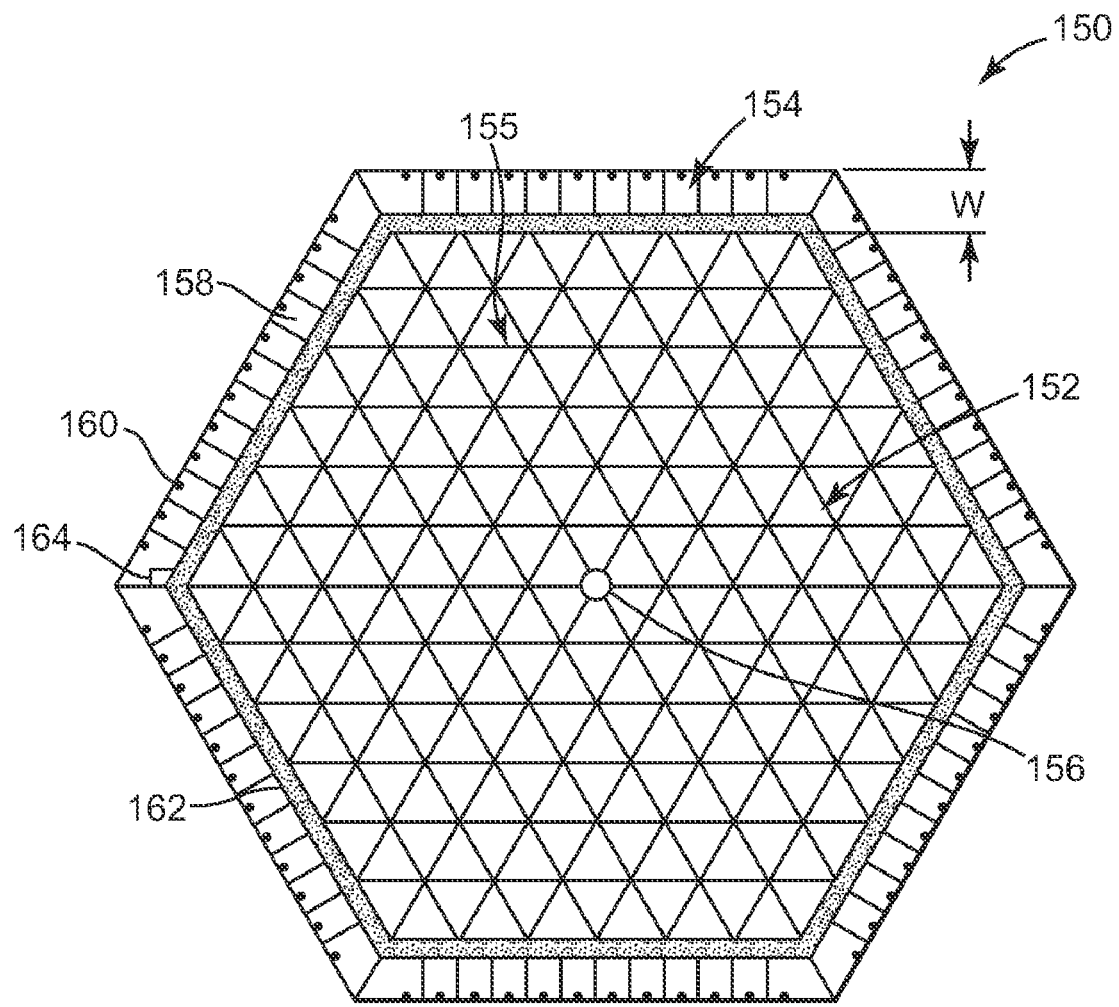
FIG. 6 is a diagram illustrating one embodiment of a hexagonal, two-dimensional, planar electrodynamic structure that includes a triangular mesh of conductors.

FIG. 6 is a diagram illustrating one embodiment of a hexagonal, two-dimensional, planar electrodynamic structure 150 that includes a triangular mesh of conductors 152 disposed in an interior area 155. Electrodynamic structure 150 is configured to generate power and/or propulsion as it orbits a celestial body having a magnetic field. In one aspect, electrodynamic structure 150 is an electrodynamic sail. In one aspect, electrodynamic structure 150 is similar to electrodynamic structure 100, with the exceptions that electrodynamic structure 150 is hexagonal and the conductors in the mesh of conductors 152 form triangular shaped cells. In other embodiments, electrodynamic structure 150 can be part of any suitable system, such as a space station.

Conductive paths in electrodynamic structure 150 include the mesh of conductors 152. The mesh of conductors 152 includes conductors that intersect other conductors to form triangular shaped cells. Switches are situated at the cross points of the conductors to direct currents through the mesh of conductors 152 and across electrodynamic structure 150 and to direct currents through closed-loop paths in the mesh of conductors 152. The triangular shaped cells increase the mechanical strength and stability of the mesh of conductors 152 and electrodynamic structure 150. Also, closed-loop currents driven through selected closed-loop paths, including triangular shaped cells, in the mesh of conductors 152 can provide improved control of the attitude dynamics of electrodynamic structure 150. In some embodiments, meshes of conductors (e.g., the mesh of conductors 152) include non-conductive supports.

A mesh of conductors, such as the mesh of conductors 152, which includes triangular shaped cells can be used in any suitable electrodynamic structure having two or three dimensions. Also, the mesh of conductors that includes triangular shaped cells can be used in any suitable electrodynamic structure having any suitable physical shape, including circular, elliptical, square, rectangular, or hexagonal.

Electrodynamic structure 150 includes the mesh of conductors 152 and periphery area 154. Electrodynamic structure 150 is coupled to a payload 156. Periphery area 154 is situated at the periphery of electrodynamic structure 150 and has width W. Payload 156 is mechanically coupled to components in periphery area 154 via the mesh of conductors 152. Interior area 155 is defined between an interior edge of periphery area 154 and payload 156.

As illustrated in FIG. 6, periphery area 154 includes electron collectors 158, electron emitters 160, solar arrays 162, and one or more controllers 164. As illustrated, electron collectors 158 and electron emitters 160 are situated at an outer rim of the periphery area 154. As illustrated, solar arrays 162 are situated on an interior rim of periphery area 154.

Electron collectors 158, electron emitters 160, solar arrays 162, and controllers 164 are electrically coupled via conductive paths formed with switches and conductors, including the mesh of conductors 152. In one embodiment, electron collectors 158 are electrically coupled to each other via the conductive paths. In one embodiment, electron emitters 160 are electrically coupled to each other via the conductive paths. In one embodiment, solar arrays 162 are electrically coupled to each other via the conductive paths.

The stabilizing mechanical property of the mesh of conductors 152 contributes to stabilizing electrodynamic structure 150. In addition, the triangular shaped cells formed via the conductors of the mesh of conductors 152 improve the mechanical strength and stability of electrodynamic structure 150. In one embodiment, the mesh of conductors 152 is a non-rigid mesh. In one embodiment, the mesh of conductors 152 includes mechanically stiffened supports and/or mechanically stiffened conductors.

In one embodiment, the mesh of conductors 152 electrically couples payload 156 to electrical components in periphery area 154. In one embodiment, payload 156 via the mesh of conductors 152 and payload 156 receives power from electrical components in periphery area 154 via the mesh of conductors 152. In one embodiment, periphery area 154 is electrically coupled to payload 156 via the mesh of conductors 152 and payload 156 includes one or more controllers that control operation of electrodynamic structure 150 via control signals communicated on the mesh of conductors.

One or more controllers 164 control operation of electrodynamic structure 150 via switches in the conductive paths, including switches in the mesh of conductors 152.

Figure 7:
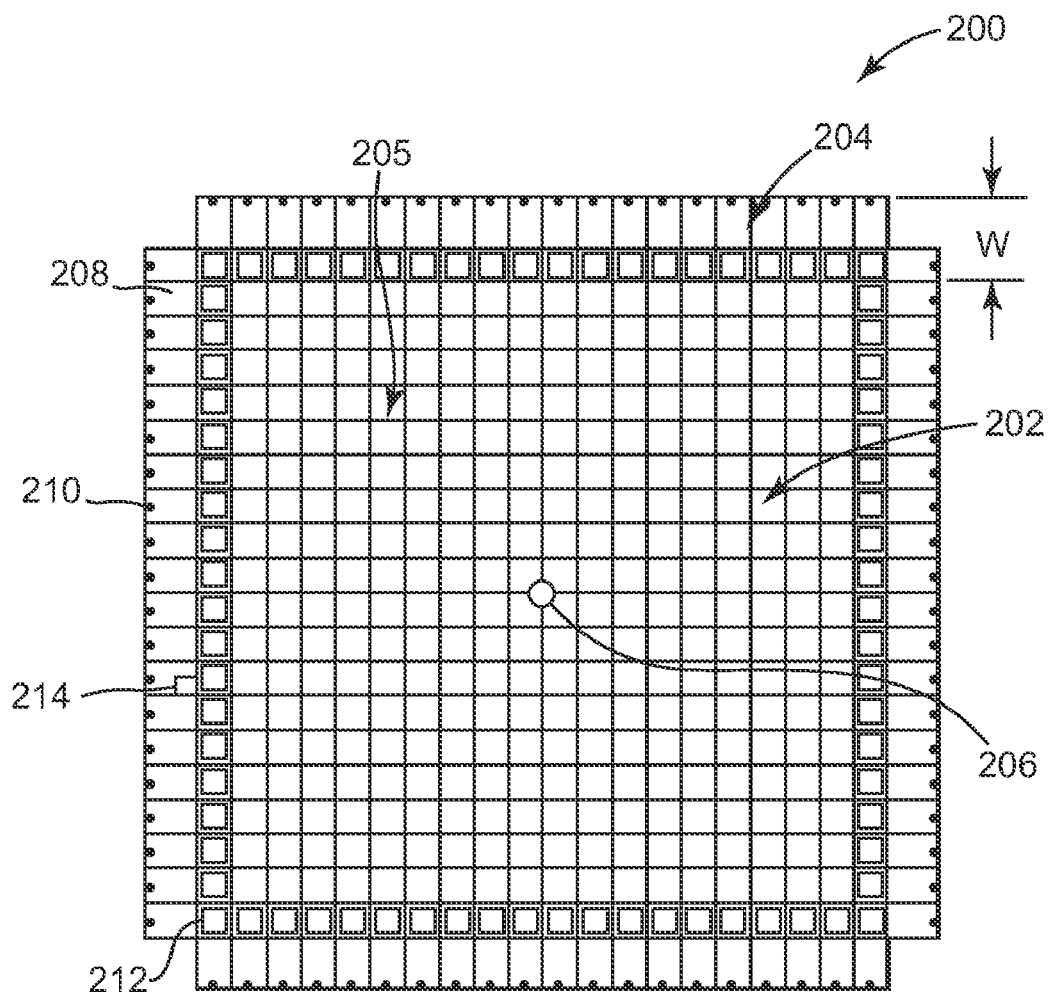
FIG. 7 is a diagram illustrating one embodiment of a rectangular, two-dimensional, planar electrodynamic structure that includes a mesh of conductors.

FIG. 7 is a diagram illustrating one embodiment of a rectangular, two-dimensional, planar electrodynamic structure 200 that includes a mesh of conductors 202 disposed in an interior area 205. Electrodynamic structure 200 is configured to generate power and/or propulsion as it orbits a celestial body having a magnetic field. In one aspect, electrodynamic structure 200 is an electrodynamic sail. In one aspect, electrodynamic structure 200 is similar to electrodynamic structures 100 and 150, with the exception that electrodynamic structure 200 is rectangular and the conductors in the mesh of conductors 202 form rectangular shaped cells. In other embodiments, electrodynamic structure 200 can be part of any suitable system, such as a space station. In one embodiment, electrodynamic structure 200 is square.

Conductive paths in electrodynamic structure 200 include the mesh of conductors 202. The mesh of conductors 202 includes conductors that intersect other conductors to form rectangular shaped cells. Switches are situated at the cross points of the conductors to direct currents through the mesh of conductors 202 and across electrodynamic structure 200 and to direct currents through closed-loop paths in the mesh of conductors 202. The mesh of conductors 202 increases the mechanical strength and stability of electrodynamic structure 200. Also, closed-loop currents driven through selected closed-loop paths in the mesh of conductors 202 can provide improved control of the attitude dynamics of electrodynamic structure 200. In some embodiments, meshes of conductors (e.g., the mesh of conductors 202) include non-conductive supports.

Electrodynamic structure 200 includes the mesh of conductors 202 and periphery area 204. Electrodynamic structure 200 is coupled to a payload 206. Periphery area 204 is situated at the periphery of electrodynamic structure 200 and has width W. Payload 206 is mechanically coupled to components in periphery area 204 via the mesh of conductors 202. Interior area 205 is defined between an interior edge of periphery area 204 and payload 206.

As illustrated in FIG. 7, periphery area 204 includes electron collectors 208, electron emitters 210, solar arrays 212, and one or more controllers 214. As illustrated, electron collectors 208 and electron emitters 210 are situated at an outer rim of the periphery area 204. As illustrated, solar arrays 212 are situated on an interior rim of periphery area 204.

Electron collectors 208, electron emitters 210, solar arrays 212, and controller 214 are electrically coupled via conductive paths formed with switches and conductors, including the mesh of conductors 202. In one embodiment, electron collectors 208 are electrically coupled to each other via the conductive paths. In one embodiment, electron emitters 210 are electrically coupled to each other via the conductive paths. In one embodiment, solar arrays 212 are electrically coupled to each other via the conductive paths.

The stabilizing mechanical property of the mesh of conductors 202 contributes to stabilizing electrodynamic structure 200. In one embodiment, the mesh of conductors 202 is a non-rigid mesh. In one embodiment, the mesh of conductors 202 includes mechanically stiffened supports and/or mechanically stiffened conductors.

In one embodiment, the mesh of conductors 202 electrically couples payload 206 to electrical components in periphery area 204. In one embodiment, payload 206 receives power from electrical components in periphery area 204 via the mesh of conductors 202. In one embodiment, payload 206 includes one or more controllers that control operation of electrodynamic structure 200 via control signals communicated on the mesh of conductors.

One or more controllers 214 control operation of electrodynamic structure 200 via the switches in the conductive paths, including the switches in the mesh of conductors 202.

Figure 8:
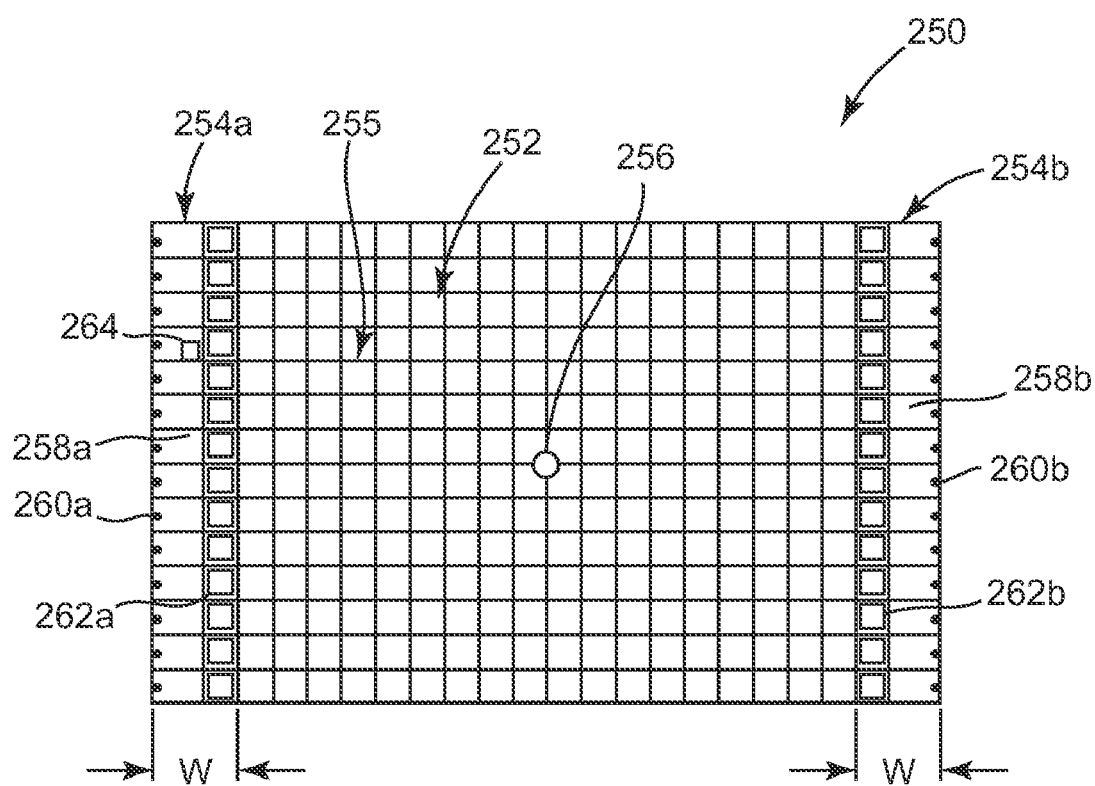
FIG. 8 is a diagram illustrating one embodiment of a rectangular, two-dimensional, planar electrodynamic structure that has only partial periphery utilization for electron collection and electron emission.

FIG. 8 is a diagram illustrating one embodiment of a rectangular, two-dimensional, planar electrodynamic structure 250 that has periphery utilization for electron collection and electron emission U of less than 1. In one embodiment, electrodynamic structure 250 has periphery utilization for electron collection and electron emission U substantially equal to ½. In other embodiments, electrodynamic structure 250 is an elongated rectangle and the periphery utilization for electron collection and electron emission U is less than ½.

Electrodynamic structure 250 is configured to generate power and/or propulsion as it orbits a celestial body having a magnetic field. In one aspect, electrodynamic structure 250 is an electrodynamic sail. In one aspect, electrodynamic structure 250 is similar to electrodynamic structure 200, with the exception that electrodynamic structure 250 does not have electron collectors or electron emitters on the top and bottom, such that periphery utilization U has been reduced to less than 1. In other embodiments, electrodynamic structure 250 can be part of any suitable system, such as a space station.

Electrodynamic structure 250 includes a mesh of conductors 252, a first periphery area 254a, and a second periphery area 254b. Electrodynamic structure 250 is coupled to a payload 256. First periphery area 254a is situated at one side periphery of electrodynamic structure 250 and has width W. Second periphery area 254b is situated at the other side periphery of electrodynamic structure 250 and has width W. The mesh of conductors 252 are disposed in an interior area 255 defined by interior edges of periphery areas 254a and 254b and interior edges of the top and bottom periphery of electrodynamic structure 250. Interior area 255 is defined between these defining interior edges and payload 256. Payload 256 is mechanically coupled to components in periphery areas 254a and 254b via the mesh of conductors 252. In some embodiments, meshes of conductors (e.g., the mesh of conductors 252) include non-conductive supports.

As illustrated in FIG. 8, first periphery area 254a includes electron collectors 258a, electron emitters 260a, solar arrays 262a, and one or more controllers 264. Electron collectors 258a and electron emitters 260a are situated at an outer rim of first periphery area 254a. Solar arrays 262a are situated on an interior rim of first periphery area 254a.

As illustrated in FIG. 8, second periphery area 254b includes electron collectors 258b, electron emitters 260b, and solar arrays 262b. Second periphery area 254b can also include one or more controllers 264. Electron collectors 258b and electron emitters 260b are situated at an outer rim of second periphery area 254b. Solar arrays 262b are situated on an interior rim of second periphery area 254b.

Electron collectors 258, electron emitters 260, solar arrays 262, and controllers 264 are electrically coupled via conductive paths formed with switches and conductors, including the mesh of conductors 252. In one embodiment, electron collectors 258a are electrically coupled to each other via the conductive paths. In one embodiment, electron collectors 258b are electrically coupled to each other via the conductive paths. In one embodiment, electron emitters 260a are electrically coupled to each other via the conductive paths. In one embodiment, electron emitters 260b are electrically coupled to each other via the conductive paths. In one embodiment, solar arrays 262a are electrically coupled to each other via the conductive paths. In one embodiment, solar arrays 262b are electrically coupled to each other via the conductive paths.

The stabilizing mechanical property of the mesh of conductors 252 contributes to stabilizing electrodynamic structure 250. In one embodiment, the mesh of conductors 252 is a non-rigid mesh. In one embodiment, the mesh of conductors 252 includes mechanically stiffened supports and/or mechanically stiffened conductors. In some embodiments, meshes of conductors (e.g., the mesh of conductors 252) include non-conductive supports.

Conductive paths in electrodynamic structure 250 include the mesh of conductors 252. The mesh of conductors 252 includes conductors that intersect other conductors to form rectangular shaped cells. Switches are situated at the cross points of the conductors to direct currents through the mesh of conductors 252 and across electrodynamic structure 250 and to direct currents through closed-loop paths in the mesh of conductors 252. Closed-loop currents driven through selected closed-loop paths in the mesh of conductors 252 provide improved control of the attitude dynamics of electrodynamic structure 250.

In one embodiment, the mesh of conductors 252 electrically couples payload 256 to electrical components in first periphery area 254a and/or second periphery area 254b. In one embodiment, payload 256 receives power from electrical components in the first periphery area 254a and/or second periphery area 254b via the mesh of conductors 252. In one embodiment, payload 256 includes one or more controllers that control operation of electrodynamic structure 250 via control signals communicated on the mesh of conductors.

One or more controllers 264 control operation of electrodynamic structure 250 via the switches in the conductive paths, including switches in the mesh of conductors 252.

The performance level of electrodynamic structure 250 can be estimated via Equation I. For a periphery utilization of U=1, the entire periphery of the electrodynamic structure is lined with electron collectors and electron emitters, such as with the rectangular electrodynamic structure 200 illustrated in FIG. 7. Electrodynamic structure 250, however, does not have electron collectors or electron emitters on the top and bottom sides. Thus, electrodynamic structure 250 has a periphery utilization for electron collection and electron emission U of less than 1. In one embodiment, electrodynamic structure 250 is substantially square and the periphery utilization for electron collection and electron emission U is substantially equal to ½. In other embodiments, electrodynamic structure 250 is an elongated rectangle having longer top and bottom sides and the periphery utilization for electron collection and electron emission U is less than ½. It is overly inefficient for the electrodynamic structure to have periphery utilization U of less than ⅕.

The area to perimeter parameter (S/P) is maximized if the electrodynamic structure is circular. If electrodynamic structure 250 is square, the area to perimeter ratio (S/P) is slightly smaller. Also, if electrodynamic structure 250 is rectangular, the area to perimeter ratio (S/P) is lower. It is overly inefficient for the electrodynamic structure to have an area to perimeter ratio (S/P) of less than ¼ of the ratio for a circle with the same perimeter.

Figure 9:
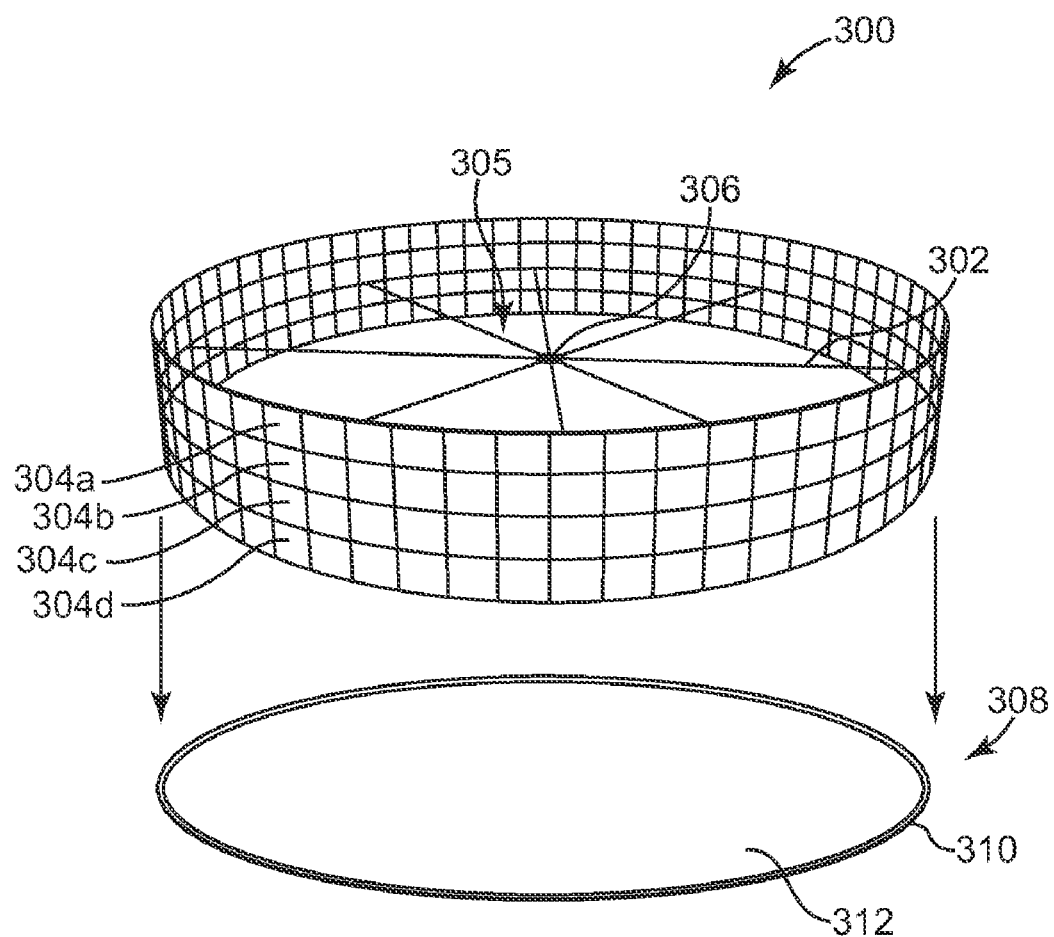
FIG. 9 is a diagram illustrating one embodiment of a cylindrical, three-dimensional electrodynamic structure.

FIG. 9 is a diagram illustrating one embodiment of a cylindrical, three-dimensional electrodynamic structure 300 that is configured to generate power and/or propulsion as it orbits a celestial body having a magnetic field. In one aspect, electrodynamic structure 300 is an electrodynamic sail. In one aspect, electrodynamic structure 300 is similar to circular, two-dimensional electrodynamic structure 20, with the exception that electrodynamic structure 300 includes one or more periphery areas situated at the periphery of electrodynamic structure 300 and perpendicular to the plane of electrodynamic structure 300. In other embodiments, electrodynamic structure 300 can be part of any suitable system, such as a space station.

Electrodynamic structure 300 includes supports 302 and periphery area with sections 304a-304d. Electrodynamic structure 300 is coupled to a payload 306. The sections of the periphery area 304a-304d are situated next to each other at the periphery of electrodynamic structure 300 and perpendicular to the plane of supports 302. Payload 306 is mechanically coupled to components in one or more periphery area sections 304a-304d via supports 302. An interior area 305 is defined between at least one interior edge of at least one of periphery area sections 304a-304d and payload 306. In some embodiments, periphery area sections have stiffness elements to maintain their shape and orientation.

In one embodiment, each of the periphery area sections 304a-304d includes electron collectors, electron emitters, and solar arrays, which are suitably arranged and electrically coupled via conductive paths formed with switches and conductors (not shown for clarity). In some embodiments, electron collectors and/or solar arrays are suitably arranged and electrically coupled in interior area 305. In some embodiments, the electron collectors, electron emitters, and solar arrays are electrically coupled via conductive paths including a mesh of conductors.

In one embodiment, supports 302 are non-rigid supports. In one embodiment, supports 302 include mechanically stiffened supports and/or mechanically stiffened conductors. In one embodiment, one or more of the supports 302 electrically couple payload 306 to electrical components in one or more periphery areas 304a-304d. In one embodiment, electrodynamic structure 300 includes a mesh of conductors in place of supports 302 to mechanically and electrically couple payload 306 to components in one or more periphery area sections 304a-304d.

In one embodiment, payload 306 receives power from electrical components in one or more periphery area sections 304a-304d via conductive paths. In one embodiment, payload 306 includes one or more controllers that control operation of electrodynamic structure 300.

Electrodynamic structure 300 includes one or more controllers that controls operation of electrodynamic structure 300 via the switches in the conductive paths. The one or more controllers control electron collectors on one side of electrodynamic structure 300 to collect electrons from the ambient plasma and electron emitters on the opposite side of electrodynamic structure 300 to emit the electrons into the ambient plasma. Also, the controller controls power generation via a power system (e.g., solar arrays) and/or EMF in the conductors to drive the collected electrons to the electron emitters on the opposite side of electrodynamic structure 300.

Similar to as described above for two-dimensional electrodynamic structures, in three-dimensional electrodynamic structures (e.g., electrodynamic structure 300), the currents flowing through the conductive paths interact with the ambient magnetic field to produce distributed Ampere forces. These forces can be used to change the orbit and the orientation of the three-dimensional electrodynamic structure. Also, the motion through the ambient magnetic field produces EMF in the conductors, which can be used to drive electrons to the opposite side of the three-dimensional electrodynamic structure.

Electrodynamic structure 300 is substantially a three-dimensional electrodynamic structure that has a two-dimensional projection 308 from the periphery of the three-dimensional structure. Periphery area sections 304a-304d project to a corresponding two-dimensional projected periphery area 310. Interior area 305 projects to a corresponding two-dimensional projected interior area 312.

If electrodynamic structure 300 is spin stabilized with the spin axis normal to the plane of supports 302, spin characteristics and dynamics of electrodynamic structure 300 are similar to spin characteristics and dynamics described above for two-dimensional electrodynamic structures.

The performance level of electrodynamic structure 300 can be estimated via Equation I as applied to electrodynamic structure 300 and the two-dimensional projection 308.

In some embodiments, all periphery area sections 304a-304d include electron collectors and electron emitters on the entire periphery of electrodynamic structure 300, which yields a utilization factor of U=1. If half of the periphery of the electrodynamic structure 300 includes electron collectors and electron emitters and the other half is empty, U=½.

The area to perimeter ratio (S/P) is calculated from the two-dimensional projection at 308. The periphery of the three-dimensional structure 300 defines the perimeter of the two-dimensional projection 308. The two-dimensional projection at 308 is circular, which provides the best area to perimeter ratio (S/P). Other shapes, such as square or hexagonal shapes, provide smaller area to perimeter ratios (S/P). Elongated shapes, such as elongated elliptical shapes and elongated rectangular shapes have even lower area to perimeter ratios (S/P).

The electric current production per unit mass of the electrodynamic structure (I/M) depends on the electron collection and electron emission technologies and on the weight of the support structures. In one embodiment, electrodynamic structure 300 has a lower specific current production rate I/M due to the mass of additional support structures, such as stiffness elements, used to maintain the non-planar shape.

Figure 10:
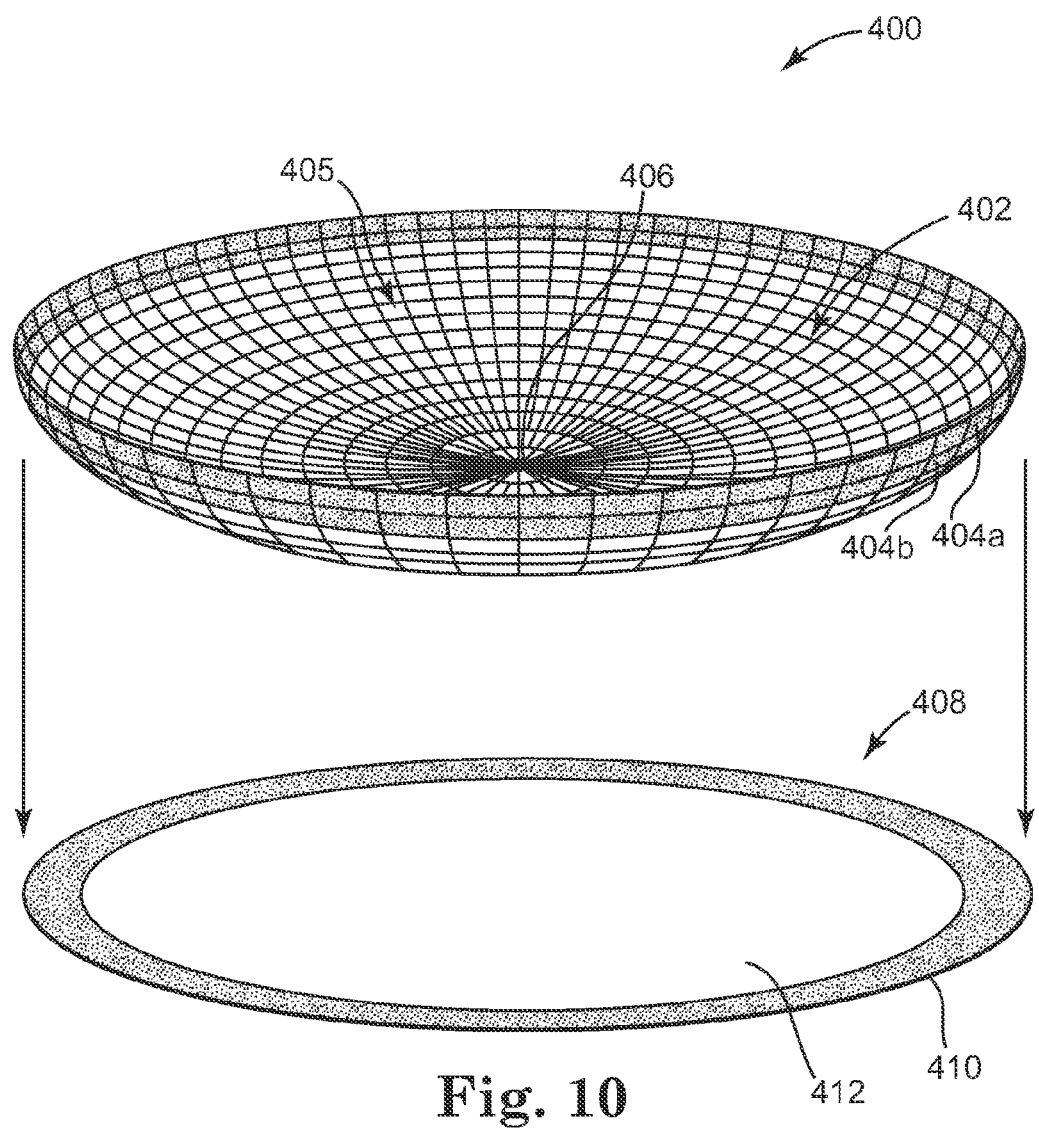
FIG. 10 is a diagram illustrating one embodiment of a curved, half-elliptical, three-dimensional electrodynamic structure.

FIG. 10 is a diagram illustrating one embodiment of a curved, half-elliptical, three-dimensional electrodynamic structure 400 that is configured to generate power and/or propulsion as it orbits a celestial body having a magnetic field. In one aspect, electrodynamic structure 400 is an electrodynamic sail. In one aspect, electrodynamic structure 400 is similar to two-dimensional electrodynamic structure 100, with the exception that electrodynamic structure 400 is a curved, elliptical shape and includes multiple sections of the periphery area 404a and 404b. In other embodiments, electrodynamic structure 400 can be part of any suitable system, such as a space station.

Electrodynamic structure 400 includes a mesh of conductors 402 and periphery area sections 404a and 404b. Electrodynamic structure 400 is coupled to a payload 406. Periphery area sections 404a and 404b are situated next to each other at the periphery of electrodynamic structure 400. Payload 406 is mechanically coupled to components in one or more periphery area sections 404a and 404b via the mesh of conductors 402. An interior area 405 is defined between an interior edge of periphery area section 404b and payload 406. The mesh of conductors 402 are disposed in interior area 405. In some embodiments, meshes of conductors (e.g., the mesh of conductors 402) include non-conductive supports.

In one embodiment, each of the periphery area sections 404a and 404b includes electron collectors, electron emitters, and solar arrays, which are suitably arranged and electrically coupled via conductive paths formed with switches and conductors, including the mesh of conductors 402. In some embodiments, electron collectors and/or solar arrays are suitably arranged and electrically coupled in interior area 405.

The stabilizing mechanical property of the mesh of conductors 402 contributes to stabilizing electrodynamic structure 400. In one embodiment, the mesh of conductors 402 is a non-rigid mesh. In one embodiment, the mesh of conductors 402 includes mechanically stiffened supports and/or mechanically stiffened conductors.

Conductive paths in electrodynamic structure 400 include the mesh of conductors 402. The mesh of conductors 402 includes conductors that intersect other conductors and switches situated at the cross points of the conductors. The switches are controlled to direct currents through the mesh of conductors 402 and across electrodynamic structure 400 and to direct currents in current loops in the mesh of conductors 402.

In one embodiment, the mesh of conductors 402 electrically couples payload 406 to the electrical components in one or more periphery area sections 404. In one embodiment, payload 406 receives power from electrical components in one or more periphery area sections 404 via the mesh of conductors 402. In one embodiment, payload 406 includes one or more controllers that control operation of electrodynamic structure 400 via control signals communicated on the mesh of conductors 402.

Electrodynamic structure 400 includes one or more controller that controls operation of electrodynamic structure 400 via switches in the conductive paths, including switches in the mesh of conductors 402.

Electrodynamic structure 400 is substantially a three-dimensional electrodynamic structure that has a two-dimensional projection 408 from the periphery of the three-dimensional structure. Periphery area sections 404a and 404b project to a corresponding two-dimensional projected periphery area 410. Interior area 405 projects to a corresponding two-dimensional projected interior area 412.

If electrodynamic structure 400 is spin stabilized with the spin axis normal to the plane of projection 408, spin characteristics and dynamics of electrodynamic structure 400 are similar to spin characteristics and dynamics described above for two-dimensional electrodynamic structures. In addition, similar to as described above for two-dimensional electrodynamic structures having meshes of conductors closed-loop currents through selected closed-loop paths in the mesh of conductors 402 can provide improved control of the attitude dynamics of electrodynamic structure 400 via the mesh of conductors 402.

The performance level of electrodynamic structure 400 can be estimated via Equation I as applied to electrodynamic structure 400 and the two-dimensional projection 408.

In some embodiments, both periphery area sections 404a and 404b include electron collectors and electron emitters on the entire periphery of electrodynamic structure 400, which yields a utilization factor of U=1. If half of the periphery of the electrodynamic structure 400 includes electron collectors and electron emitters and the other half is empty, U=½.

The area to perimeter ratio (S/P) is calculated from the two-dimensional projection at 408. The periphery of the three-dimensional structure 400 defines the perimeter of the two-dimensional projection at 408. The two-dimensional projection at 408 is circular, which provides the best area to perimeter ratio (S/P). Other shapes, such as square or hexagonal shapes, provide smaller area to perimeter ratios (S/P). Elongated shapes, such as elongated elliptical shapes and elongated rectangular shapes have even lower area to perimeter ratios (S/P).

The electric current production per unit mass of the electrodynamic structure (I/M) depends on the electron collection and electron emission technologies and on the weight of the support structures. In one embodiment, electrodynamic structure 400 has a lower specific current production rate I/M due to the mass of additional support structures, such as stiffness elements, used to maintain the non-planar shape.

Figure 11:
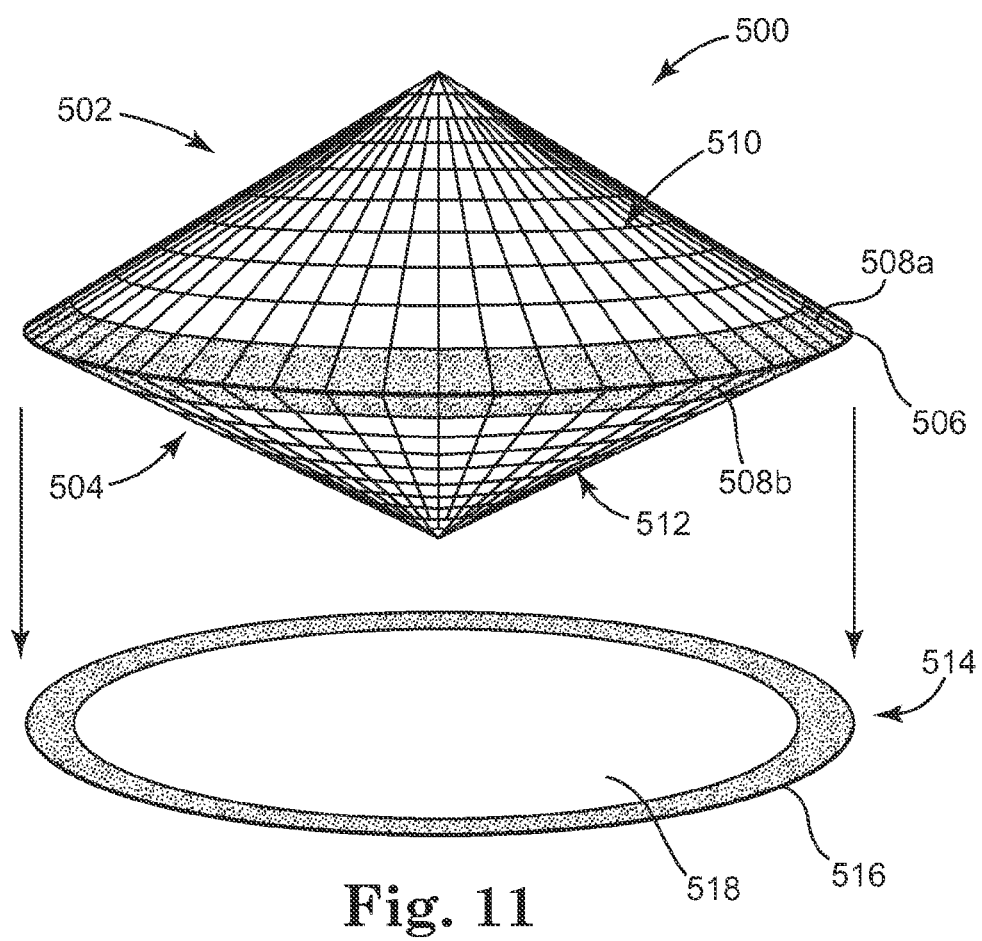
FIG. 11 is a diagram illustrating one embodiment of an enclosed, three-dimensional electrodynamic structure.

FIG. 11 is a diagram illustrating one embodiment of an enclosed, three-dimensional electrodynamic structure 500 that includes an upper conical section 502 and a lower conical section 504 coupled at a line of connection 506. Periphery area 508a is situated at the periphery of upper conical section 502. Periphery area 508b is situated at the periphery of lower conical section 504. Periphery areas 508a and 508b meet at the line of connection 506.

Electrodynamic structure 500 is configured to generate power and/or propulsion as it orbits a celestial body having a magnetic field. In one aspect, electrodynamic structure 500 is an electrodynamic sail. In other embodiments, electrodynamic structure 500 can be part of any suitable system, such as a space station.

Electrodynamic structure 500 includes periphery areas 508a and 508b, an upper mesh of conductors 510, and a lower mesh of conductors 512. Electrodynamic structure 500 can be coupled to a payload situated inside electrodynamic structure 500 or at a point of one of the conical sections 502 and 504. The payload can be mechanically coupled to the upper mesh of conductors 510 and/or the lower mesh of conductors 512. In one embodiment, components in periphery areas 508a and 508b are coupled to each other at the line of connection 506. The upper mesh of conductors 510 and the lower mesh of conductors 512 are three-dimensional meshes. In one embodiment, the upper mesh of conductors 510 and the lower mesh of conductors 512 are not mounted on a substrate and are not covered with material. In some embodiments, the upper mesh of conductors 510 and the lower mesh of conductors 512 are mounted on a substrate. In one embodiment, the substrate is reflective. In some embodiments, meshes of conductors (e.g., the mesh of conductors 510) include non-conductive supports.

In one embodiment, each of the periphery areas 508a and 508b includes electron collectors, electron emitters, and solar arrays, which are suitably arranged and electrically coupled via conductive paths formed with switches and conductors, which include the upper and lower meshes of conductors 510 and 512. In some embodiments, electron collectors and/or solar arrays are suitably arranged and electrically coupled on surfaces of conical sections 502 and 504 other than in the periphery areas 508a and 508b.

The stabilizing mechanical properties of the upper and lower meshes of conductors 510 and 512 contribute to stabilizing electrodynamic structure 500. In one embodiment, each of the upper and lower meshes of conductors 510 and 512 is a non-rigid mesh. In one embodiment, each of the upper and lower meshes of conductors 510 and 512 includes mechanically stiffened supports and/or mechanically stiffened conductors. In one embodiment, electrodynamic structure 500 includes stiffness supports between conical sections 502 and 504 to maintain its non-planar shape.

Conductive paths in electrodynamic structure 500 include the upper and lower meshes of conductors 510 and 512. Each of the upper and lower meshes of conductors 510 and 512 includes conductors that intersect other conductors and switches situated at the cross points of the conductors. The switches are controlled to direct currents through the upper and lower meshes of conductors 510 and 512 and across electrodynamic structure 500 and to direct currents in current loops in each of the upper and lower meshes of conductors 510 and 512.

In one embodiment, one or more of the upper and lower meshes of conductors 510 and 512 electrically couples the payload to electrical components in one or more periphery areas 508a and 508b. In one embodiment, the payload receives power from electrical components in one or more periphery areas 508a and 508b via one or both of the upper and lower meshes of conductors 510 and 512. In one embodiment, the payload includes one or more controllers that control operation of electrodynamic structure 500 via control signals communicated on one or both of the mesh of conductors 510 and 512.

Electrodynamic structure 500 includes one or more controllers that control operation of electrodynamic structure 500 via switches in the conductive paths, including switches in the upper and lower meshes of conductors 510 and 512.

Electrodynamic structure 500 is substantially a three-dimensional electrodynamic structure that has a two-dimensional projection 514 from the periphery of the three-dimensional structure. Periphery areas 508a and 508b project to a two-dimensional projected periphery area 516. The portions of conical sections 502 and 504 that do not include periphery areas 508a and 508b project to a corresponding two-dimensional projected interior area 518.

If electrodynamic structure 500 is spin stabilized with the spin axis normal to the plane of projection 514, spin characteristics and dynamics of electrodynamic structure 500 are similar to spin characteristics and dynamics described above for two-dimensional electrodynamic structures. In addition, similar to as described above for two-dimensional electrodynamic structures having meshes of conductors closed-loop currents through selected closed-loop paths in the upper and lower meshes of conductors 510 and 512 can provide improved control of the attitude dynamics of electrodynamic structure 500.

The performance level of electrodynamic structure 500 can be estimated via Equation I as applied to electrodynamic structure 500 and the two-dimensional projection 514.

In some embodiments, both periphery areas 508a and 508b include electron collectors and electron emitters on the entire periphery of electrodynamic structure 500, which yields a utilization factor of U=1. If half of the periphery of the electrodynamic structure 500 includes electron collectors and electron emitters and the other half is empty, U=½.

The area to perimeter ratio (S/P) is calculated from the two-dimensional projection at 514. The periphery of the three-dimensional structure 500 defines the perimeter of the two-dimensional projection 514. The two-dimensional projection at 514 is circular, which provides the best area to perimeter ratio (S/P). Other shapes, such as square or hexagonal shapes, provide smaller area to perimeter ratios (S/P). Elongated shapes, such as elongated elliptical shapes and elongated rectangular shapes have even lower area to perimeter ratio (S/P).

The electric current production per unit mass of the electrodynamic structure (I/M) depends on the electron collection and electron emission technologies and on the weight of the support structures. In one embodiment, electrodynamic structure 500 has a lower specific current production rate I/M due to the mass of additional support structures, such as stiffness elements, used to maintain the non-planar shape.

Two-and three-dimensional electrodynamic structures can fly a variety of missions, taking advantage of propellantless propulsion and virtually unlimited changes in velocity. Two- and three-dimensional electrodynamic structures can repeatedly go from orbit to orbit, with or without payloads, dramatically changing orbital elements in a matter of weeks or months, and keeping all inclinations within reach.

If desired, the propulsion capabilities of the two-and three-dimensional electrodynamic structures can be augmented by mounting ion thrusters at various points of the electrodynamic structure and utilizing some of the energy collected by the solar arrays of the electrodynamic structure for ion propulsion.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An electrodynamic method comprising:
providing an electrodynamic structure;
providing power;
collecting electrons with collectors;
emitting electrons with emitters;
providing a total length of conductors at least 20% larger than the perimeter of the largest planar projection area of the smallest single shape without holes enclosing the collectors, the emitters, and the conductors; and
conducting current through the conductors to provide at least one of electrodynamic propulsion and power generation;
wherein the largest planar projection area of the smallest single shape without holes enclosing the collectors, the emitters, and the conductors is at least 25% of an area of a circle having a circle perimeter equal to the perimeter of the largest planar projection area.

2. The electrodynamic method of claim 1, comprising:
controlling collecting electrons, emitting electrons, and conducting current to provide the at least one of electrodynamic propulsion and power generation.

3. The electrodynamic method of claim 1, comprising:
controlling collecting electrons, emitting electrons, and conducting to control system dynamics through an interaction between electric currents and an ambient magnetic field.

4. The electrodynamic method of claim 1, comprising:
controlling switches to direct current through the conductors and provide the at least one of electrodynamic propulsion and power generation.

5. The electrodynamic method of claim 1, comprising:
changing direction of the conducting current to control the at least one of electrodynamic propulsion and power generation.

6. The electrodynamic method of claim 1, comprising:
controlling collecting electrons, emitting electrons, and conducting current to generate power from electro-motive force.

7. The electrodynamic method of claim 1, comprising:
controlling collecting electrons, emitting electrons, and conducting current to control solar energy collection rates.

8. The electrodynamic method of claim 1, comprising:
controlling collecting electrons, emitting electrons, and conducting current to produce a cumulative variation of orbital elements over a given period of time.

9. The electrodynamic method of claim 1, comprising:
controlling collecting electrons, emitting electrons, and conducting current to change at least one of spin axis, spin phase, and rotation rate.

10. The electrodynamic method of claim 1, comprising:
controlling switches to control closed loop currents and produce torque to thereby control an attitude of the electrodynamic structure.

11. The electrodynamic method of claim 1, comprising:
controlling conducting current to control rotation rate of the electrodynamic structure to spin stabilize the electrodynamic structure.

12. The electrodynamic method of claim 1, wherein the electrodynamic structure has a periphery and the emitting electrons and the collecting electrons utilizes at least 20% of the periphery of the electrodynamic structure.

13. An electrodynamic method comprising:
providing an electrodynamic structure with a periphery;
providing power;
collecting electrons with collectors;
emitting electrons with emitters, wherein the emitting electrons and the collecting electrons utilizes at least 20% of the periphery of the electrodynamic structure; and
conducting current through conductive paths to provide at least one of electrodynamic propulsion and power generation;
wherein the largest planar projection area of the smallest single shape without holes enclosing the collectors, the emitters, and the conductive paths is at least 25% of an area of a circle having a circle perimeter equal to the perimeter of the largest planar projection area.

14. The electrodynamic method of claim 13, comprising:
controlling collecting electrons, emitting electrons, and conducting current to provide the at least one of electrodynamic propulsion and power generation.

15. The electrodynamic method of claim 13, comprising:
controlling collecting electrons, emitting electrons, and conducting to control system dynamics through an interaction between electric currents and an ambient magnetic field.

16. The electrodynamic method of claim 13, comprising:
controlling switches in the conductive paths to direct current through the conductive paths and provide the at least one of electrodynamic propulsion and power generation.

17. The electrodynamic method of claim 13, comprising:
changing direction of the conducting current to control the at least one of electrodynamic propulsion and power generation.

18. The electrodynamic method of claim 13, comprising:
controlling collecting electrons, emitting electrons, and conducting current to generate power from electro-motive force.

19. The electrodynamic method of claim 13, comprising:
controlling collecting electrons, emitting electrons, and conducting current to control solar energy collection rates.

20. The electrodynamic method of claim 13, comprising:
controlling collecting electrons, emitting electrons, and conducting current to produce a cumulative variation of orbital elements over a given period of time.

21. The electrodynamic method of claim 13, comprising:
controlling collecting electrons, emitting electrons, and conducting current to change at least one of spin axis, spin phase, and rotation rate.

22. The electrodynamic method of claim 13, comprising:
controlling switches in the conductive paths to control closed loop currents and produce torque to thereby control an attitude of the electrodynamic structure.

23. The electrodynamic method of claim 13, comprising:
controlling conducting current to control rotation rate of the electrodynamic structure to spin stabilize the electrodynamic structure.

24. The electrodynamic method of claim 13, comprising:
providing a total length of conductors at least 20% larger than the perimeter of the largest planar projection area of the smallest single shape without holes enclosing the collectors, the emitters, and the conductive paths.

* * * * *